United States Patent
Reiff et al.

(10) Patent No.: US 9,937,922 B2
(45) Date of Patent: Apr. 10, 2018

(54) COLLISION AVOIDANCE USING AUDITORY DATA AUGMENTED WITH MAP DATA

(71) Applicant: Ford Global Technologies, LLC, Dearborn, MI (US)

(72) Inventors: Brielle Reiff, Cincinnati, OH (US); Madeline Jane Schrier, Palo Alto, CA (US); Nithika Sivashankar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 171 days.

(21) Appl. No.: 14/876,269

(22) Filed: Oct. 6, 2015

(65) Prior Publication Data
US 2017/0096138 A1  Apr. 6, 2017

(51) Int. Cl.
*B60W 30/09* (2012.01)
*G05D 1/00* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS

| 6,084,973 A * | 7/2000 | Green | H04R 3/005 381/92 |
| 6,285,771 B1 * | 9/2001 | Killion | H04R 1/406 381/313 |

(Continued)

FOREIGN PATENT DOCUMENTS

| JP | H0592767 U | 12/1993 |
| JP | 2011232292 A | 11/2011 |

(Continued)

OTHER PUBLICATIONS

China: 6th Intelligent Vehicle Future Challenge (IVFC'2014) in Changshu, http://telematicswire.net/china6thintelligentvehiclefuturechallengeivfc2014inchangshu/.

*Primary Examiner* — Navid Ziaeianmehdizadeh
(74) *Attorney, Agent, or Firm* — David R. Stevens; Stevens Law Group

(57) ABSTRACT

A controller for an autonomous vehicle receives audio signals from one or more microphones and identifies sounds. The controller further identifies an estimated location of the sound origin and the type of sound, i.e. whether the sound is a vehicle and/or the type of vehicle. The controller analyzes map data and attempts to identify a landmark within a tolerance from the estimated location. If a landmark is found corresponding to the estimated location and type of the sound origin, then the certainty is increased that the source of the sound is at that location and is that type of sound source. Collision avoidance is then performed with respect to the location of the sound origin and its type with the certainty as augmented using the map data. Collision avoidance may include automatically actuating brake, steering, and accelerator actuators in order to avoid the location of the sound origin.

16 Claims, 4 Drawing Sheets

(51) Int. Cl.

| | | |
|---|---|---|
| *G06F 19/00* | (2011.01) | |
| *B60W 10/04* | (2006.01) | |
| *B60W 10/18* | (2012.01) | |
| *B60W 10/20* | (2006.01) | |
| *H04R 1/32* | (2006.01) | |
| *G05D 1/02* | (2006.01) | |
| *G01S 13/93* | (2006.01) | |

(52) U.S. Cl.
CPC ......... *G05D 1/0088* (2013.01); *G05D 1/0255* (2013.01); *G05D 1/0274* (2013.01); *H04R 1/326* (2013.01); *B60W 2420/10* (2013.01); *B60W 2420/54* (2013.01); *B60W 2550/14* (2013.01); *B60W 2710/18* (2013.01); *B60W 2710/20* (2013.01); *B60W 2720/10* (2013.01); *G01S 2013/936* (2013.01); *G01S 2013/9357* (2013.01); *G05D 2201/0213* (2013.01)

(56) References Cited

U.S. PATENT DOCUMENTS

| | | | | |
|---|---|---|---|---|
| 7,116,792 | B1* | 10/2006 | Taenzer | H04R 3/005 381/313 |
| 8,072,491 | B2* | 12/2011 | Kondo | G05B 15/02 348/143 |
| 8,521,352 | B1* | 8/2013 | Ferguson | G05D 1/0274 340/435 |
| 8,571,743 | B1* | 10/2013 | Cullinane | G05D 1/00 701/23 |
| 8,605,948 | B2 | 12/2013 | Mathony | |
| 8,676,427 | B1* | 3/2014 | Ferguson | B60W 30/00 701/23 |
| 9,478,139 | B2* | 10/2016 | Hsu | G08G 1/166 |
| 2005/0143918 | A1* | 6/2005 | Hilliard | G01S 19/52 701/301 |
| 2006/0058920 | A1* | 3/2006 | Matsunaga | B25J 9/1694 700/245 |
| 2008/0082220 | A1* | 4/2008 | Saito | B60C 23/0408 701/1 |
| 2009/0066538 | A1* | 3/2009 | Thomas | G06Q 30/0266 340/903 |
| 2010/0217435 | A1* | 8/2010 | Rodemann | G10L 25/00 700/245 |
| 2011/0077813 | A1* | 3/2011 | Hadsell | G05D 1/0246 701/26 |
| 2013/0222127 | A1* | 8/2013 | Ray Avalani | B60Q 9/008 340/436 |
| 2015/0158482 | A1 | 6/2015 | Kaminade | |
| 2015/0283703 | A1* | 10/2015 | Izhikevich | B25J 9/163 706/11 |
| 2016/0016560 | A1* | 1/2016 | Parker | B60W 30/09 701/70 |
| 2016/0026182 | A1* | 1/2016 | Boroditsky | H04L 67/306 701/23 |
| 2016/0082978 | A1* | 3/2016 | Ozaki | G01C 21/34 701/58 |
| 2016/0161271 | A1* | 6/2016 | Okumura | B60W 30/09 701/25 |
| 2016/0217689 | A1* | 7/2016 | Young | G08G 1/0965 |
| 2017/0101093 | A1* | 4/2017 | Barfield, Jr. | B60W 30/095 |
| 2017/0120908 | A1* | 5/2017 | Oniwa | B60W 30/10 |

FOREIGN PATENT DOCUMENTS

| | | |
|---|---|---|
| JP | 4967927 B2 | 7/2012 |
| JP | 5303998 B2 | 10/2013 |

* cited by examiner

COLLISION AVOIDANCE USING AUDITORY DATA AUGMENTED WITH MAP DATA

BACKGROUND

Field of the Invention

This invention relates to performing obstacle avoidance in autonomous vehicles.

Background of the Invention

Autonomous vehicles are equipped with sensors that detect their environment. An algorithm evaluates the output of the sensors and identifies obstacles. A navigation system may then steer the vehicle, brake, and/or accelerate to both avoid the identified obstacles and reach a desired destination. Sensors may include both imaging system, e.g. video cameras, as well as RADAR or LIDAR sensors.

The systems and methods disclosed herein provide an improved approach for detecting obstacles.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
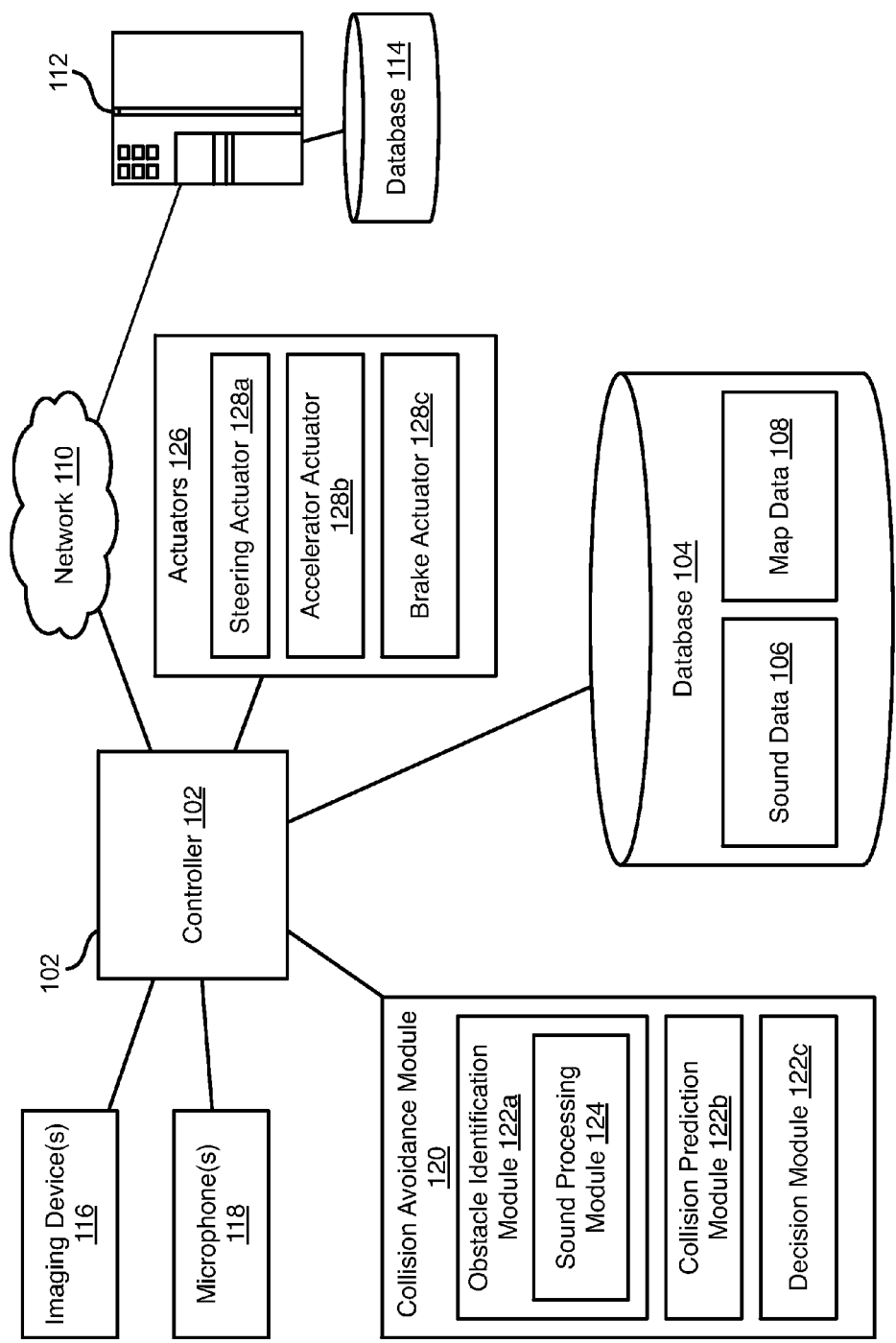
FIG. 1 is a schematic block diagram of a system for implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, auditory and map data may be analyzed to identify potential obstacles.

The controller 102 may include or access a database 104 housed in the vehicle or otherwise accessible by the controller 102. The database 104 may include data sufficient to enable identification of an obstacle using map data. For example, sound data 106 may contain data describing sounds generated by one or more types of vehicles or other potential obstacles. For example, sound data 106 may include samples of the sounds made by one or more types of vehicles, animals (e.g. a dog barking), people conversing, and the like. Alternatively, sound data 106 may contain data describing such sounds, such as a spectrum of such sounds, or other data derived from a recording of such sounds.

The database 104 may further include map data 108. The map data 108 may include maps in the region of the vehicle, such as the city, state, or country in which the vehicle is located. The maps may include data describing roads, landmarks, businesses, public buildings, etc. In particular, the map data 108 may include the locations of emergency vehicle stations (fire stations, hospitals with ambulance service, police stations, etc.).

In some embodiments, the controller 102 may periodically connect to a network 110, such as the Internet or other network. The controller 102 may retrieve some or all of the data stored in the database 104 from one or more servers 112 hosting or accessing a database 114 storing such information. For example, sound signatures or samples of sounds of one or more vehicles or other potential obstacles may be retrieved from the database 114. Likewise, current map data 108 may be periodically retrieved from a database 114.

The controller 102 may receive one or more image streams from one or more imaging devices 116. For example, one or more cameras may be mounted to the vehicle and output image streams received by the controller 102.

The controller 102 may further receive audio signals from one or more microphones 118. The one or more microphones 118 may be an array of microphones offset from one another such that differences in amplitude and time of arrival of a sound may be used to determine one or both of the direction to a source of the sound and the distance to the sound. The one or more microphones may be directional microphones that are more sensitive to sounds originating from a particular direction. The microphones 118 and the circuits or algorithms used to derive one or both of the distance and direction to a source of a sound may be according to any method known in the art of SONAR or any other approach for identifying the location of a source of sound known in the art.

The controller may execute a collision avoidance module 120 that receives the image streams and audio signals and identifies possible obstacles and takes measures to avoid them. In the embodiments disclosed herein, only image and auditory data is used to perform collision avoidance. However, other sensors to detect obstacles may also be used such as RADAR, LIDAR, SONAR, and the like.

The collision avoidance module 120 may include an obstacle identification module 122a that analyzes the one or more image streams and identifies potential obstacles, including people, animals, vehicles, buildings, curbs, and other objects and structures. In particular, the obstacle identification module 122a may identify vehicle images in the one or more image streams. The obstacle identification module 122a may include a sound processing module 124 that identifies potential obstacles using the audio signals in combination with map data 108 and possibly the sound data 106. The method by which auditory and map data are used to identify potential obstacles is described in greater detail below.

The collision avoidance module 120 may further include a collision prediction module 122b that predicts which obstacle images are likely to collide with the vehicle based on its current trajectory or current intended path. A decision module 122c may make a decision to stop, accelerate, turn, etc. in order to avoid obstacles. The manner in which the collision prediction module 122b predicts potential collisions and the manner in which the decision module 122c takes action to avoid potential collisions may be according to any method or system known in the art of autonomous vehicles.

The decision module 122c may control the trajectory of the vehicle by actuating one or more actuators 126 controlling the direction and speed of the vehicle. For example, the actuators 126 may include a steering actuator 128a, accelerator actuator 128b, and a brake actuator 128c. The configuration of the actuators 128a-128c may be according to any implementation of such actuators known in the art of autonomous vehicles.

Figure 2:
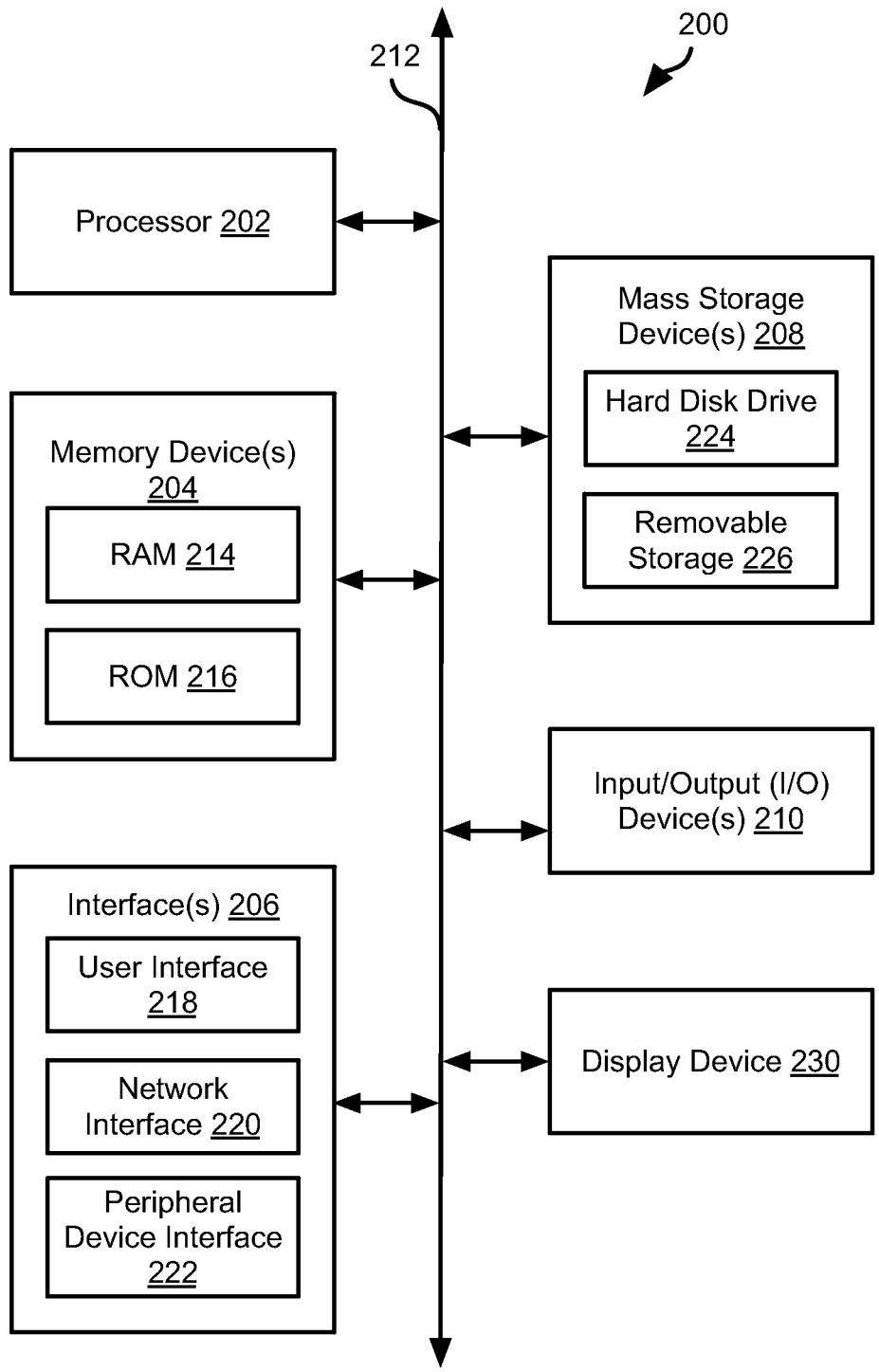
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3A:
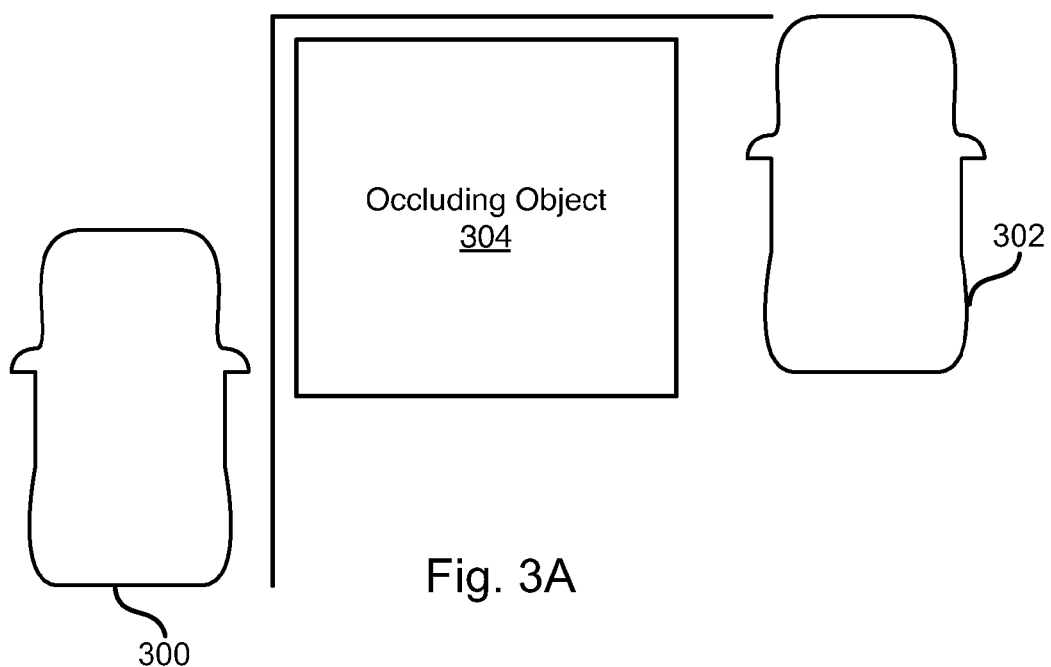
FIGS. 3A and 3B are diagrams illustrating obstacle detection using auditory and map data.
Figure 3B:
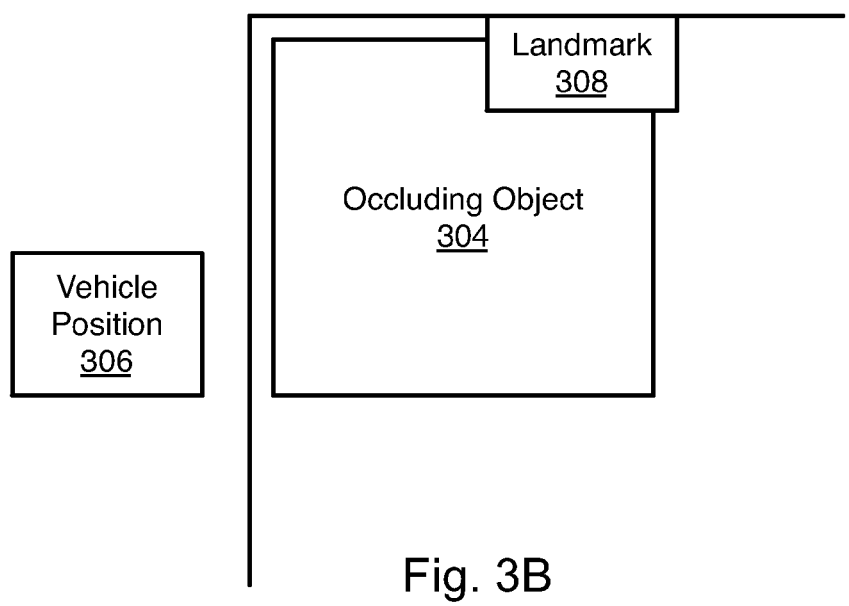

Turning now to FIGS. 3A and 3B, in many instances a vehicle housing the controller 102 (hereinafter the vehicle 300) may be prevented from visually detecting a potential object, such as another vehicle 302, by an occluding object 304 such as building, tree, sign, etc. Accordingly, imaging devices 116 may not be effective at detecting such obstacles. However, the vehicle 300 may be close enough to detect sound generated by the other vehicle 302 or other obstacle. Although the methods disclosed herein are particularly useful where there is an occluding object 304, the identification of obstacles as described herein may be performed where image data is available and may, for example, confirm the location of an obstacle that is also visible to imaging devices 116.

Audible signals detected from the other vehicle 302 or other obstacle, as shown in FIG. 3A may be compared to map data as shown in FIG. 3B. For example, the position 306 of the vehicle 300 may be identified in the map using a GPS (global positioning system) receiver mounted to the vehicle 300 and landmarks in the region of the position 306 may be identified from map data. The identity and location of the occluding object 304 may also be identified. A landmark 308 corresponding to the vehicle 302 or other obstacle may be selected from the map data as corresponding to one or both of the direction and distance to a source of sound as detected using the one or more microphones 118. For example, a direction and or location to a sound source as detected using the one or more microphones 118 may have an uncertainty or tolerance associated therewith. The landmark 308 corresponding to the sound source may be selected due to the landmark 308 being positioned within that tolerance from the direction and/or location of the sound source as determined from the audio signals from the microphones 118.

For example, where the landmark 308 corresponding to a sound source is determined to be a parking garage, it may be inferred that a vehicle is exiting the parking garage and measures may be taken to avoid it. Likewise, where the landmark 308 is an emergency vehicle station and the sound detected is a siren, it may be inferred that an emergency vehicle is leaving the station and measures may be taken to pull over or otherwise take measures to avoid it. If the vehicle 300 is driving on a first road and the landmark 308 is a second road that intersects with the first road, it may be inferred that a vehicle on the second road could be about to turn onto the first road.

Figure 4:
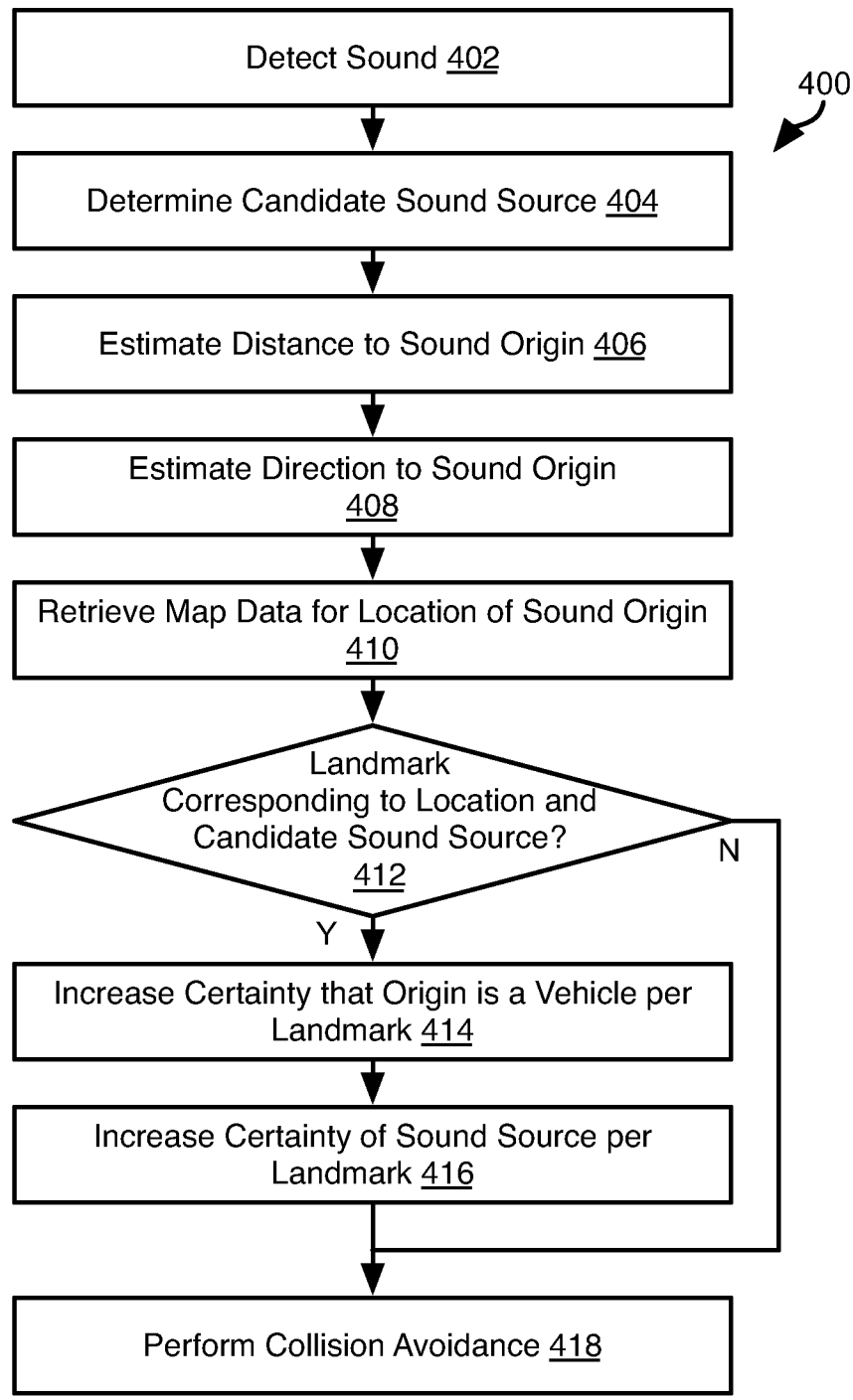
FIG. 4 is a process flow diagram of a method for performing collision avoidance based on both auditory and map data in accordance with an embodiment of the present invention.

FIG. 4 illustrates a method 400 that may be executed by the controller by processing audio signals from the one or more microphones 118.

The method 400 may include detecting 402 a sound and determining 404 one or more likely sources of the sound. For example, a wave form or spectrum of the sound may be compared to those of one or more sources in the sound data 106. Candidate sound sources 404 may be identified that have similarity to the detected sound exceeding a threshold condition. Candidate sound sources may be estimated to be a vehicle, person, animal, or other sound producing entity for which sound data 106 is stored.

Some or all of the remaining steps of the method 400 may be executed for all sounds detected 402 or only for sounds corresponding to vehicles or other potential obstacles. Accordingly, if, at step 404, the sound is found not to match a vehicle or other potential obstacle, then the remaining steps of the method 400 may be omitted.

The method 400 may include one or both of estimating 406 a distance to the origin of the sound and estimating 408 a direction to the origin of the sound. In some instances, by determining differences in a time of arrival of the sound at offset microphones 108, both the distance to the origin and its direction may be determined simultaneously, i.e. a location estimate is derived. In other embodiments, separate microphones 118 or processing steps are used to estimate 406, 408 the distance and direction to the origin of the sound.

The method 400 may include retrieving 410 map data in a region including the estimated location of the sound origin as determined at steps 406 and 408. And evaluating 412 whether the map data includes a landmark corresponding to the location and candidate source of the sound origin. For example, a landmark closest to the location of the sound origin may be identified 412. For example, where the candidate sound source is determined at step 404 to be a vehicle and a parking garage is within a specified tolerance from the location determined at steps 406 and 408, then it may be determined that the parking garage is the landmark corresponding to the sound detected at step 402. As noted above, the tolerance may be a region or range of angles and distances corresponding to the uncertainty in determining the location, direction, and distance, respectively of the sound origin. In another scenario, an emergency vehicle station is within the tolerance from the sound origin and the candidate sound source is an emergency vehicle, then it may be determined at step 412 that the landmark corresponding to the sound detected at step 402 is the emergency vehicle station.

If a corresponding landmark is identified at step 412, then the method 400 may include increasing 414 a certainty or confidence value indicating that a vehicle is located at the location determined at steps 406, 408. For example, a collision avoidance algorithm may identify potential obstacles. An obstacle may have a confidence value associated therewith that indicates the likelihood that an artifact in an image or detected in audio signals actually corresponds to a vehicle. Only those obstacles having a confidence value higher than a threshold may be considered for collision avoidance.

Alternatively, increasing 414 the certainty may increase options available to avoid the vehicle at the sound origin. For example, if a vehicle is detected but there is low certainty as to its location, a collision avoidance module 120 may slow down the vehicle in order to avoid a potential collision at a wide range of possible locations. However, if the location of the vehicle at the sound origin is known with high certainty (i.e. as increased at step 414), then the collision avoidance module 120 need only adjust speed and direction to avoid that known location along with any other identified obstacles.

The method 400 may further include increasing 416 certainty as to candidate source of the sound based on the landmark identified at step 412. For example, if the candidate source of the sound is an emergency vehicle and the landmark determined at step 412 is determined to be an emergency vehicle station, then the confidence that the source of the sound was in fact an emergency vehicle may be increased 416. The collision avoidance module 120 may therefore take steps to pull over or otherwise avoid the emergency vehicle.

In either outcome of step 412 collision avoidance is performed 418 with respect to obstacles detected. As noted above, increasing 414, 416 the certainty as to the location and source of a sound may be used by the collision avoidance module 120 to avoid collisions. However, the source of the sound detected at step 402 may not necessarily be ignored during collision avoidance 418, but rather its possible locations may be greater. This is particularly true where the candidate sound source determined at step 404 is a vehicle or person.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A controller for an autonomous vehicle comprising:
   one or more processing devices programmed to:
   receive one or more audio streams from one or more microphones;
   retrieve map data in a region about the autonomous vehicle;
   detect, in the one or more audio streams, a probable vehicle-originated sound;
   identity a first predicted location of the probable vehicle-originated sound;
   calculate a confidence level associated with the first predicted location according to the one or more audio streams;
   retrieve map data in a region proximate the first, predicted location;
   if the map data indicates a vehicle-specific landmark within a threshold distance from the first predicted location, increase the confidence level; and
   if the confidence level exceeds a threshold condition, perform obstacle avoidance with respect to the first predicted location.

2. The controller of claim 1, wherein the one or more processing devices are further programmed to invoke obstacle avoidance with respect to the probable location of the vehicle by actuating at least one of a steering actuator, accelerator actuator, and brake actuator of the autonomous vehicle effective to avoid the probable location of the other vehicle.

3. The controller of claim 1, wherein:
   the one or more microphones are an array of microphones and the one or more audio streams are a plurality of audio streams from the array of microphones;
   the one or more processing devices are further programmed to identify the first predicted location of the probable vehicle-originated sound by comparing at least one of time of arrival and intensity of the probable vehicle-originated sound in the plurality of audio streams.

4. The controller of claim 1, wherein the one or more microphones are directional microphones.

5. The controller of claim 1, wherein the vehicle-specific landmark is at least one of a parking lot and emergency vehicle station.

6. The controller of claim 5, wherein the one or more processing devices are further programmed to:
   identify a predicted vehicle type from the probable vehicle-originated sound;
   if the predicted vehicle type corresponds to the vehicle specific landmark, confirming the predicted vehicle type.

7. The controller of claim 6, wherein the one or more processing devices are further programmed to:
   if the predicted vehicle type corresponds to the vehicle specific landmark and the vehicle specific landmark is an emergency vehicle station, invoking pulling over and stopping of the autonomous vehicle.

8. The controller of claim 1, wherein the probable location of the other vehicle is not within a line of sight of an imaging system of the autonomous vehicle.

9. An autonomous vehicle comprising:
   a vehicle including an engine and wheels selectively coupled to the engine;
   at least one of a steering actuator, accelerator actuator, and brake actuator;
   one or more microphones;
   a controller operably coupled to the one or more microphones and the at least one of the steering actuator, the accelerator actuator, and the brake actuator, the controller including one or more processing devices programmed to:
   receive one or more audio streams from the one or more microphones;
   retrieve map data in a region about the autonomous vehicle;
   if the one or more audio streams indicate a vehicle-generated sound:
   estimate a probable location of an other vehicle that generated the vehicle-generated sound;
   calculate a confidence level associated with the probable location according to the one or more audio streams;
   retrieve map data for a region including the probable location;

if the map data indicates a vehicle specific landmark within a threshold distance from the probable location, augment the confidence level; and if the confidence level exceeds a threshold condition, perform obstacle avoidance with respect to the probable location.

10. The autonomous vehicle of claim 9, wherein the one or more processing devices are further programmed to invoke obstacle avoidance with respect to the probable location of the other vehicle by actuating at least one of a steering actuator, accelerator actuator, and brake actuator of the autonomous vehicle effective to avoid the probable location of the other vehicle.

11. The autonomous vehicle of claim 9, wherein:
the one or more microphones are an array of microphones and the one or more audio streams are a plurality of audio streams from the array of microphones;
the one or more processing devices are further programmed to identify the first predicted location of the probable vehicle-originated sound by comparing at least one of time of arrival and intensity of the probable vehicle-originated sound in the plurality of audio streams.

12. The autonomous vehicle of claim 9, wherein the one or more microphones are directional microphones.

13. The autonomous vehicle of claim 9, wherein the vehicle specific landmark is at least one of a parking lot and emergency vehicle station.

14. The autonomous vehicle of claim 13, wherein the one or more processing devices are further programmed to:
identify a predicted vehicle type from the probable vehicle-originated sound;
if the predicted vehicle type corresponds to the vehicle specific landmark, confirming the predicted vehicle type.

15. The autonomous vehicle of claim 14, wherein the one or more processing devices are further programmed to:
if the predicted vehicle type corresponds to the vehicle specific landmark and the vehicle specific landmark is an emergency vehicle station, invoking pulling over and stopping of the autonomous vehicle.

16. The autonomous vehicle of claim 9, wherein the probable location of the other vehicle is not within a line of sight of an imaging system of the autonomous vehicle.

* * * * *

UNITED STATES PATENT AND TRADEMARK OFFICE
CERTIFICATE OF CORRECTION

PATENT NO. : 9,937,922 B2  
APPLICATION NO. : 14/876269  
DATED : April 10, 2018  
INVENTOR(S) : Brielle Reiff et al.

Page 1 of 1

It is certified that error appears in the above-identified patent and that said Letters Patent is hereby corrected as shown below:

In the Claims

Column 7, Claim 1, Line 58 should read:
identify a first predicted location of the probable vehicle-originated sound;

Signed and Sealed this
Twenty-seventh Day of November, 2018

Andrei Iancu
*Director of the United States Patent and Trademark Office*